United States Patent
Upadhya et al.

(10) Patent No.: US 12,438,567 B2
(45) Date of Patent: Oct. 7, 2025

(54) SERDES METHOD AND DEVICE HAVING A PROTOCOL-AGNOSTIC IN-BAND MANAGEMENT CHANNEL

(71) Applicant: Credo Technology Group Limited, Grand Cayman (KY)

(72) Inventors: Ashwin Upadhya, Fremont, CA (US); Haoli Qian, Fremont, CA (US); Fang Cai, San Carlos, CA (US)

(73) Assignee: Credo Technology Group Limited, Grand Cayman (KY)

( * ) Notice: Subject to any disclaimer, the term of this patent is extended or adjusted under 35 U.S.C. 154(b) by 157 days.

(21) Appl. No.: 18/533,703

(22) Filed: Dec. 8, 2023

(65) Prior Publication Data

US 2025/0192813 A1    Jun. 12, 2025

Related U.S. Application Data

(60) Provisional application No. 63/545,235, filed on Oct. 23, 2023.

(51) Int. Cl.
*H04B 1/38*    (2015.01)
*H04L 7/04*    (2006.01)

(52) U.S. Cl.
CPC ................... *H04B 1/38* (2013.01); *H04L 7/04* (2013.01)

(58) Field of Classification Search
CPC ................... H04B 1/38; H04L 7/04
See application file for complete search history.

(56) References Cited

U.S. PATENT DOCUMENTS

| | | | |
|---|---|---|---|
| 9,106,570 B2 | 8/2015 | Masood et al. | |
| 9,385,859 B2 | 7/2016 | Kuan et al. | |
| 9,606,955 B2 * | 3/2017 | Chen | G06F 13/4291 |
| 9,648,402 B2 * | 5/2017 | Clarke | H04J 3/1652 |
| 10,212,260 B2 | 2/2019 | Sun | |
| 10,877,233 B1 | 12/2020 | Dai et al. | |
| 12,197,357 B2 * | 1/2025 | Safranek | G06F 13/4286 |
| 2010/0272102 A1 * | 10/2010 | Kobayashi | H04L 69/08 370/389 |
| 2013/0343400 A1 | 12/2013 | Lusted | |
| 2014/0086264 A1 | 3/2014 | Lusted | |
| 2014/0146833 A1 | 5/2014 | Lusted | |
| 2015/0003505 A1 | 1/2015 | Lusted et al. | |
| 2016/0323164 A1 | 11/2016 | Cao | |
| 2016/0337114 A1 | 11/2016 | Baden et al. | |
| 2017/0324657 A1 | 11/2017 | Zhong | |
| 2018/0041332 A1 | 2/2018 | Yang et al. | |

* cited by examiner

*Primary Examiner* — Dac V Ha
(74) *Attorney, Agent, or Firm* — RAMEY LLP; Daniel J. Krueger (57) ABSTRACT

In-band communication methods and transceivers are provided to enable protocol-agnostic management channel. One illustrative in-band communications method includes: buffering an outbound data stream from a host-side receiver with a data stream buffer, the outbound data stream having a first bit rate; and providing a line-side data stream representing the outbound data stream with an additional word after every N words of the outbound data stream, the line-side data stream having a second bit rate derived from a fill level of the data stream buffer, the additional words including message words and idle words with adjacent message words potentially separated by a predetermined number of idle words.

20 Claims, 5 Drawing Sheets

SERDES METHOD AND DEVICE HAVING A PROTOCOL-AGNOSTIC IN-BAND MANAGEMENT CHANNEL

TECHNICAL FIELD

The present disclosure relates generally to serializer/deserializer transceivers and more specifically to transceivers that provide an in-band communication channel for exchanging management information.

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This Ethernet standard provides a common media access control specification for local area network (LAN) operations at selected speeds from 1 Mb/s to 100 Gb/s over coaxial cable, twin axial cable, twisted wire pair cable, fiber optic cable, and electrical backplanes, with various channel signal constellations. As demand continues for ever-higher data rates, the standard is being extended. Such extensions to the standard must account for increased channel attenuation and dispersion even as the equalizers are forced to operate at faster symbol rates. It is becoming increasingly difficult to provide affordable, mass-manufactured network hardware that assures consistently robust performance as the proposed per-lane bit rates rise beyond 50 Gbps with PAM4 or larger signal constellations over distance spans more than a couple of meters.

For distance spans of no more than 2 meters, attenuation is reasonably limited such that passive copper cable, also known as direct-attach cable or "DAC", can often be employed. Data centers having larger distance spans may need to rely on active optical cable (AOC) designs having data recovery and remodulation (DRR) chips in the cable connectors to convert the electrical interface signals into optical signals transported by optical fiber, even though such cables typically come with a higher cost. More sophisticated DRR chips also enable active ethernet cable (AEC) designs to offer affordable high-bandwidth data transport using electrical conductors over distance spans up to at least seven meters. The DRR devices in AOC and AEC designs typically exchange management information via a dedicated channel such as a twisted wire pair between the end connectors. (Examples of management information may include configuration information, status information, firmware updates, and the like.) This dedicated channel may add undesired material cost and bulk to active cables.

As with most integrated circuit devices, the DRR chips have become so complex that it is impractical for electronic device designers to design them from scratch. Instead, electronic device designers rely on predefined modular units of integrated circuit layout designs, arranging and joining them as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("IP core", "soft macro") but are frequently employed interchangeably.

The modular units can be expressed in different ways, e.g., in the form of a hardware description language (HDL) file, or as a fully routed design that could be printed directly to a series of manufacturing process masks. Fully routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully routed units may offer better predictability in terms of areal requirements, reliability, and performance. While there is no fixed rule, digital module designs are more commonly specified in HDL form, while analog and mixed-signal units are more commonly specified as a lower-level, physical description.

Serializer-deserializer (SerDes) cores are a frequent need for device designs that employ modern data communications standards, which continue to evolve towards higher symbol rates and larger numbers of bits per channel symbol. At higher symbol rates, channel symbols become more attenuated and dispersed as they propagate, causing evermore severe intersymbol interference (ISI) at the receiving end of the channel. When trying to detect the channel symbols, receivers must contend with this ISI in addition to the channel noise that contaminates the receive signal. There exists at least one such SerDes core design that obviates any need for dedicated conductors for the management information. See, e.g., U.S. Pat. No. 10,212,260 "SerDes Architecture with a hidden backchannel protocol". However, it is protocol-specific, limiting the core's versatility.

SUMMARY

Accordingly, there are disclosed herein in-band communication methods and transceivers that enable a protocol-agnostic management channel. One illustrative in-band communications method includes: buffering an outbound data stream from a host-side receiver with a data stream buffer, the outbound data stream having a first bit rate; and providing a line-side data stream representing the outbound data stream with an additional word after every N words of the outbound data stream, the line-side data stream having a second bit rate derived from a fill level of the data stream buffer, the additional words including message words and idle words with adjacent message words separated by a predetermined number of idle words.

An illustrative in-band communications transceiver includes: a data stream buffer, insertion logic, and a line-side transmitter. The data stream buffer is configured to buffer an outbound data stream from a host-side receiver, the outbound data stream having a first bit rate. The insertion logic is configured to create a line-side data stream representing the outbound data stream by inserting an additional word after every N words of the outbound data stream, the additional words forming a sequence including message words and idle words with adjacent message words separated by a predetermined number of idle words, the predetermined number being greater than zero. The line-side transmitter is configured to transmit the line-side data stream at a second bit rate that is derived from a fill level of the data stream buffer.

The foregoing method and transceiver can be embodied as a semiconductor IP core stored on a nontransient information storage medium. When used by a suitably configured computer, the semiconductor IP core provides the circuit and/or process mask designs for manufacturing integrated circuit devices having the above-described transceiver components to implement the above-described communication method.

Each of the foregoing method, transceiver, and core implementations may be embodied individually or conjointly and may be combined with any one or more of the following optional features: 1. a transmit buffer configured to store a packet of message words, the packet including a first message word. 2. the sequence of additional words includes a message preamble separated from the first message word by the predetermined number of idle words. 3. the predetermined number of idle words is greater than one. 4. N is $10^4$ or greater. 5. a line-side receiver configured to receive a line-side data stream representing an inbound data stream with an extra word after every N words of the inbound data stream, the extra words including receive message words and idle words, with adjacent receive message words separated by the predetermined number of idle words. 6. extraction logic configured to store the receive message words in a receive buffer and to store the inbound data stream in the data stream buffer. 7. a host-side transmitter configured to transmit the inbound data stream without the extra words. 8. each of the idle words in the line-side data stream representing the inbound data stream includes a status field indicating whether a remote transceiver is synchronized to the additional words. 9. each of the idle words in the line-side data stream representing the outbound data stream includes a status field indicating whether the extraction logic is synchronized to the extra words. 10. the extraction logic is configured to pause a write clock to the data stream buffer when storing a receive message word in the receive buffer. 11. the extraction logic is configured to implement a finite state machine for achieving and maintaining synchronization with the extra words. 12. the insertion logic is configured to pause a read clock to the data stream buffer when inserting an additional word. 13. the insertion logic is configured to implement a finite state machine for transmitting packets of message words with the predetermined number of idle words between the adjacent message words.

DETAILED DESCRIPTION

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

Figure 1:
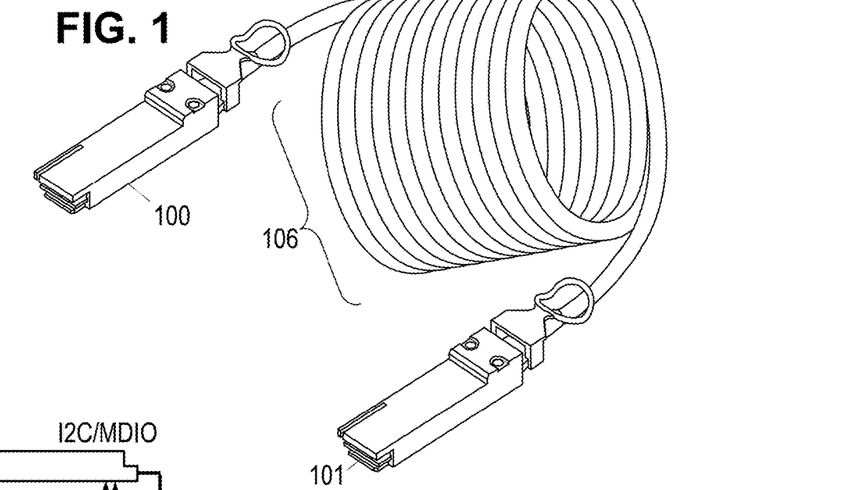
FIG. 1 is a perspective view of an illustrative active cable.

FIG. 1 is a perspective view of an illustrative cable that may be used to provide a high-bandwidth communications link between devices in a routing network. The routing network may be or include, for example, the Internet, a wide area network, a storage area network, or a local area network. The linked devices may be computers, switches, routers, and the like. The cable includes a first end connector 100 and a second end connector 101 that are electrically connected via electrical conductors or optically coupled via optical fibers in a cord 106. The electrical conductors may be electrically conductive wires arranged in a paired form such as with twin axial conductors. Twin axial conductors can be likened to coaxial conductors, but with two inner conductors instead of one. The inner conductors may be driven with a differential signal and their shared shield operates to reduce crosstalk with other twin axial conductors in the cable. Depending on the performance criteria, it may be possible to employ other paired or single-ended conductor implementations.

Pursuant to the Ethernet standard, each conductor pair may provide unidirectional transport of a differential signal. For optical cables, the optical fibers may provide unidirectional transport of optical signals. To enable robust performance over even extended cable lengths, each end connector 100, 101 may include a powered transceiver that performs clock and data recovery (CDR) and re-modulation of data streams, hereafter called a data recovery and re-modulation (DRR) device. The DRR devices process data streams traveling in each direction. Notably, the transceivers perform CDR and re-modulation not only of the inbound data streams to the host interface as they exit the cable, but also of the outbound data streams from the host interface entering the cable.

It is acknowledged here that the outbound data streams may be expected to be compliant with the relevant standard (e.g., the Ethernet standard for 400 Gbps) and may be expected to have experienced essentially no deterioration from their traversal of the network interface port's receptacle pins and the cable assembly's connector plug pins. Nevertheless, the modulation quality and equalization strategy employed by the electronics manufacturer of the transmitting network interface is generally unknown and the minimum requirements of the standard may be inadequate for transport over an extended cable length, particularly if the electronics manufacturer of the receiving network interface is different than that of the transmitting network interface. As with the transmitting network interface, the equalization and demodulation strategy employed by the electronics manufacturer of the receiving network interface is generally unknown and may be unable to cope with the attenuation and interference caused by signal transport over an extended cable length, particularly if the connectors aren't fully seated or if the contacts have tarnished. By performing DRR of both inbound and outbound data streams, the illustrative cable ensures that the electrical signals transiting the cable conductors are able to withstand the attenuation and interference encountered between the cable's end connectors, thereby enabling consistently robust data transfer over extended cable lengths to be assured without consideration of these factors.

Figure 2:
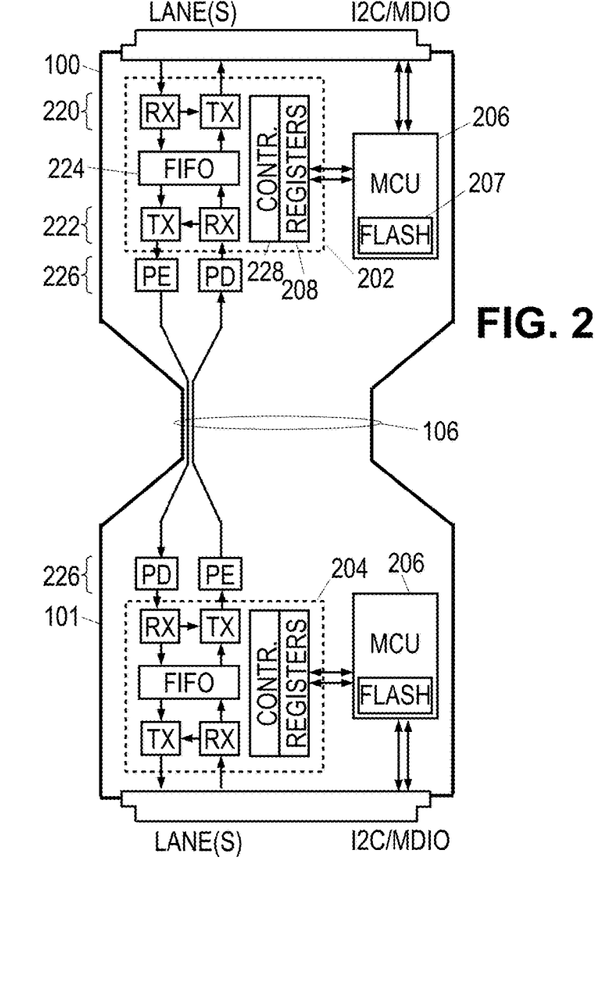
FIG. 2 is a function-block diagram of the illustrative active cable.

FIG. 2 is a function-block diagram of the illustrative cable of FIG. 1. End connector 100 includes a plug adapted to fit a standard-compliant Ethernet port in a first host device to receive an electrical input signal carrying an outbound data stream from the host device and to provide an electrical output signal carrying an inbound data stream to the host device. Similarly, end connector 101 includes a plug that fits an Ethernet port of a second host device. End connector 100 includes a first DRR device 202 to perform CDR and re-modulation of the data streams entering and exiting the cable at end connector 100, and end connector 101 includes a second DRR device 204 to perform CDR and re-modulation of the data streams entering and exiting the cable at end connector 101. The DRR devices 202, 204 may each be an integrated circuit device mounted on a printed circuit board and connected to connector plug pins via circuit board traces.

In at least some contemplated embodiments, the printed circuit boards each also support a micro-controller unit (MCU) 206. Each DRR device 202, 204 is coupled to a respective MCU device 206 which configures the operation of the DRR device via a first two-wire bus. At power-on, the MCU device 206 loads equalization parameters from Flash memory 207 into the DRR device's configuration registers 208. The host device can access the MCU device 206 via a second two-wire bus that operates in accordance with the I2C bus protocol and/or the faster MDIO protocol. With this access to the MCU device 206, the host device can adjust the cable's operating parameters and monitor the cable's performance.

Each DRR device 202, 204, includes a set 220 of host-side transmitters and receivers ("transceivers") for communicating with the host device and a set 222 of line-side transmitters and receivers for sending and receiving via conductor pairs or optical fibers running the length of the cord 106. The DRR devices for the illustrated cable each couple to a set 226 of photoemitters (PE) and photodetectors (PD) for converting between electrical signals for the DRR devices and optical signals for transport over the optical fibers. Only one communication lane is shown for ease of illustration, but in practice the cable may employ multiple communication lanes over corresponding differential conductor pairs or optical fibers or multiple multiplexed channels on a single conductor pair or optical fiber to support higher communication bandwidths. The DRR devices may include a memory 224 to provide first-in first-out (FIFO) buffering between the transceiver sets 220, 222. An embedded controller 228 coordinates the operation of the transmitters and receivers by, e.g., setting initial equalization parameters and ensuring the training phase is complete across all lanes and links before enabling the transmitters and receivers to enter the data transfer phase. The embedded controller 228 employs a set of registers 208 to receive commands and parameter values, and to provide responses potentially including status information and performance data.

As previously mentioned, there exists a need to exchange messages between the two end connectors 100, 101. An in-band messaging technique offers a way to avoid the added bulk and cost that would be associated with a dedicated channel for management information. Disclosed herein is an in-band messaging technique that is agnostic of the data stream communication protocol. In this technique, the line-side signaling employs a slightly higher symbol rate than the host-side signaling. As described further below, the baud rate increase is expected to be no more than about 10 parts-per-million (ppm), which should be well within the channel tolerance.

Figure 3:
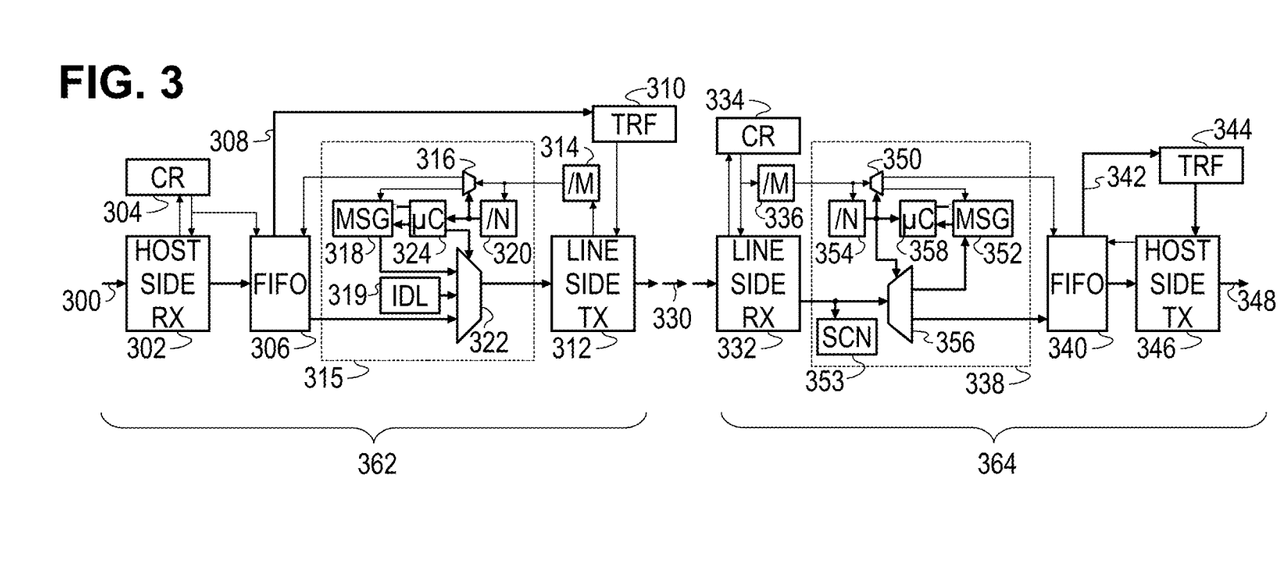
FIG. 3 is a function-block diagram of an illustrative communication channel.

FIG. 3 shows an illustrative communication channel from a local transmitter 362 to a remote receiver 364 to illustrate the in-band messaging technique. For ease of illustration, only one direction is shown. In practice, a second identical channel from a remote transmitter to a local receiver would be provided for communications in the opposite direction.

In the local transmitter, a host-side receiver 302 (from transceiver set 220 of FIG. 2) receives an outbound analog signal 300. Based on the analog signal 300 and/or the receiver's symbol decision margins, a clock recovery module 304 derives a sampling clock signal for recovering the outbound data stream from the outbound analog signal 300. A first-in first-out (FIFO) buffer 306 provides temporary storage of the outbound data stream until the recovered portion can be retransmitted by the line-side transmitter 312. The FIFO buffer 306 provides fill level information 308 to a timing regeneration filter (TRF) block 310, which derives a phase offset signal therefrom. The line-side transmitter 312 includes a clock generator that generates a transmit clock signal based on the phase offset signal. The frequency of the transmit clock signal is adaptively adjusted based on the phase offset signal from the TRF block 310 to maintain a relatively stable fill level for the FIFO buffer 306.

A modulo-M frequency divider 314 converts the transmit clock signal into a word clock signal for the insertion logic 315, where M is the number of channel symbols that can be retrieved in parallel from the FIFO buffer 306. Note that the channel symbols can be 1-bit symbols (e.g., bipolar modulation), 2-bit symbols (e.g., quadrature amplitude modulation), or higher. Typical values of M include 32, 64, and 128. The frequency divider 314 enables the message insertion logic 315 to operate at a lower clock frequency.

The message insertion logic 315 includes a clock demultiplexer 316, an outbound message buffer 318, a modulo-N frequency divider or counter 320, a data multiplexer 322, and an embedded controller 324. The clock demultiplexer 316 steers the word clock to either the FIFO buffer 306 or (when enabled by the embedded controller 324) the message buffer 318 to read either a data word or a message word, respectively. In addition to message words, or in the absence of a message, the insertion logic 315 may control the data multiplexer to periodically select an idle pattern from idle logic 319. The counter 320 asserts a messaging interval clock signal once for every N pulses of the word clock signal. Illustrative values of N include $10^4$, $10^5$, $10^6$, $10^7$, $2^{14}$, $2^{15}$, $2^{16}$, $2^{17}$, $2^{18}$, $2^{19}$, $2^{20}$. Other values would also be suitable. Lower values shorten the messaging interval, reducing latency but increasing the messaging bandwidth and potentially raising the transmit clock frequency to a point where the communication channel's performance begins to deteriorate. Higher values lengthen the messaging interval, increasing latency and reducing messaging bandwidth, but minimizing any effect on performance. A net messaging rate of about 1 kilobaud is expected to be adequate, enabling N to be set potentially as high as $10^5$ in a four-lane 100 Gbd cable. Higher messaging rates are also contemplated, limited only by the ability of the TRF block 310 to limit timing jitter potentially caused by the intermittent insertion of additional message and idle words.

When the messaging interval clock is de-asserted, the demultiplexer 316 steers the word clock signal to the FIFO buffer 306 as a read clock signal and the data multiplexer 322 forwards a word from the outbound data stream to the line-side transmitter 312. When the messaging interval clock signal is asserted, the demultiplexer 316 steers the word clock signal to the message buffer 318 as a read clock (when buffer 318 is enabled by controller 324) and the data multiplexer 322 forwards a message word to the line-side transmitter 312 as an additional word to be inserted into the retransmitted outbound data stream. As discussed further below, the controller 324 may alternatively used the multiplexer 322 to insert an idle pattern as an additional word to be inserted in the line-side outbound data stream. The embedded controller 324 operates in response to the message interval clock to control the outbound message buffer contents, to monitor the local inbound message buffer contents (described further below), and to insert idle patterns and preambles in accordance with the messaging protocol.

The retransmitted outbound data stream is conveyed as an analog signal 300 by the cable to the remote receiver 364. At the remote receiver 364, a line-side receiver 332, with the aid of a clock recovery module 334, converts the analog signal into a digital sequence representing the outbound data stream including the additional symbols provided by insertion logic 315. (Hereafter, the term "additional" symbols will be used in reference to the insertion logic, while in reference to the extraction logic 353 these symbols will be called "extra" symbols.) The clock recovery module 334 derives a sampling clock signal for the line-side receiver 332 from the analog signal 330 and/or the receiver's symbol decision margins. A modulo-M frequency divider 336 converts the sampling clock signal into a word clock signal for extraction logic 338.

Extraction logic 338 includes a clock demultiplexer 350, a receive message buffer 352, scan logic 353, an interval counter 354, a data demultiplexer 356, and an embedded controller 358. The clock demultiplexer 350 steers the word clock signal to a FIFO buffer 340 or the receive message buffer 352, this time as a write clock signal. The interval counter 354 converts the word clock signal into a messaging interval clock signal for the clock demultiplexer 350, the data demultiplexer 356, and the controller 358. When the messaging interval clock signal is de-asserted, the clock demultiplexer 350 and the data demultiplexer 356 respectively steer the word clock signal and a word of the outbound data stream to the FIFO buffer 340. When the messaging interval clock signal is asserted, the clock demultiplexer 350 and the data demultiplexer 356 may respectively steer the word clock signal and the current data word to the message buffer 352, thereby extracting the message words from the outbound data stream. When the extra words are expected to be idle or preamble patterns, the controller 358 disables the receive message buffer and these extra words are not stored in either the FIFO buffer or the receive message buffer. Scan logic 353 may initially be used to scan for a periodic idle pattern to achieve synchronization, and thereafter may be used to maintain synchronization and to monitor the synchronization ("lock") status of the transceiver at the other end of the cable. The controller 358 implements a finite state machine to control the scan logic 353, to store content in the remote receive message buffer 352, and to control the idle logic at the local end of the cable to provide an idle pattern, synchronization status, and a message preamble pattern in accordance with the protocol outlined below.

The remote receiver 364 further includes a TRF block 344 that, based on the fill level of the FIFO buffer 340, derives a phase offset signal for the host-side transmitter's clock generator. The host-side transmitter 346 generates a transmit clock with a frequency that is adaptively adjusted as needed to maintain a relatively stable fill level. A host-side transmitter 346 converts the outbound data stream into an analog signal 348 that conveys the outbound data stream to the host. The insertion logic 315 and the extraction logic 338 may be agnostic to whatever communication protocol is being implemented by the host-side and line-side transmitters and receivers, enabling the IP cores for this logic to be readily adapted for use with different SerDes modules. With this design the host sides of the DRR devices may continue to operate at a standard clock frequency to support error free traffic at the established line rate, while the line sides operate at a slightly higher clock frequency to enable messaging.

The local transmitter's embedded controller 324 for the insertion logic 315 may also serve as an embedded controller for the local receiver's extraction logic, employing the idle logic 319 and local scan logic to implement the messaging protocol described below. Similarly, the remote receiver's embedded controller 358 may also serve as an embedded controller for the remote transmitter's insertion logic, employ the idle and scan logic at the remote end of the cable to collaboratively implement the messaging protocol with the local end of the cable. Each embedded controller may implement the finite state machines of FIG. 4 (message transmission), FIG. 5 (receive lock detection) and FIG. 6 (message reception). Each of the transitions in the finite state machines is provided with a 3-digit label, e.g., 410, with the rightmost digit indicating the originating state, the middle digit indicating the destination state, and the leftmost digit indicating the figure number. Thus the 410 example appears in FIG. 4 between the initial, zero state (INIT) and the first state (NO_LOCK). All State transitions other than to and from the initial state occur are made at the modulo-N count, i.e., in accordance with the interval clock signal.

Figure 4:
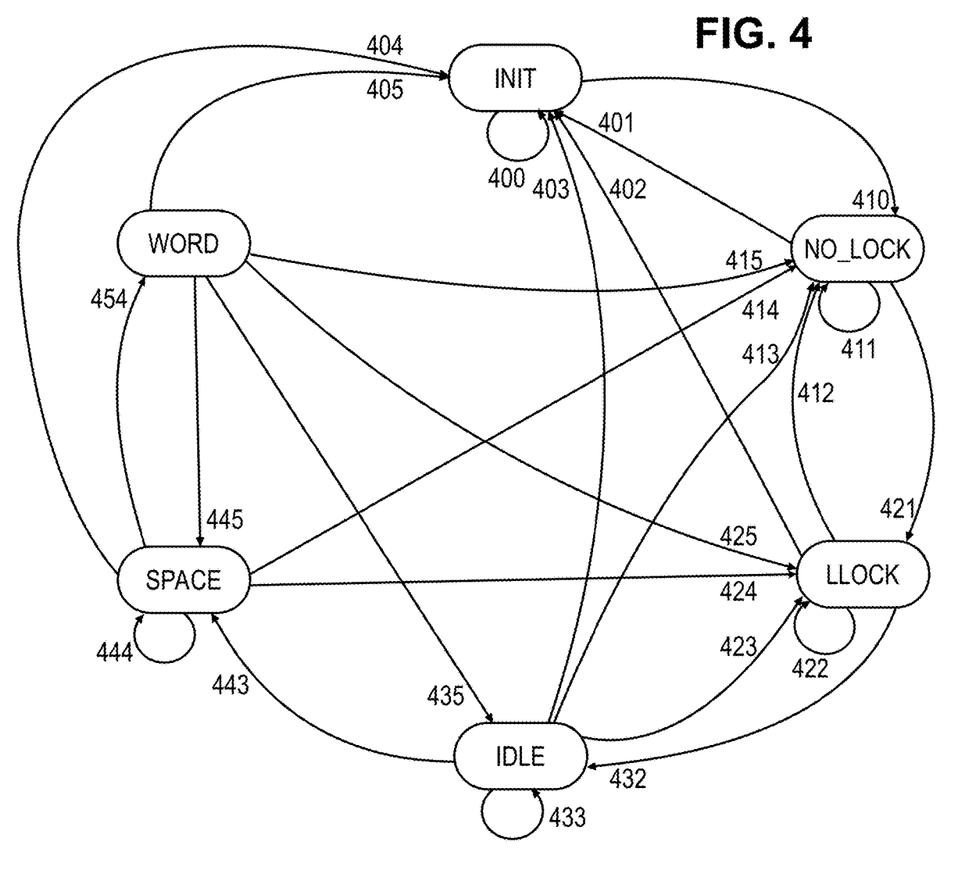
FIG. 4 is a flow diagram of an illustrative finite state machine for message transmission.

FIG. 4 shows an illustrative finite state machine for message transmission having six states: the initial (INIT) state, the "no lock" (NO_LOCK) state, the "local lock" (LLOCK) state, the idle (IDLE) state, the space (SPACE) state, and the message word (WORD) state. The initial state represents the situation in which the insertion logic 315 is disabled, whether due to an error, a reset, or de-assertion of an enable signal (i.e., when the in-band messaging channel is disabled). The no lock state represents a situation in which the insertion logic 315 has been enabled but the local extraction logic has not yet synchronized to the messaging interval clock of the remote end. The local lock state represents a situation in which the local extraction logic has synchronized to the interval clock of the remote end, but the remote extraction logic has not yet synchronized to the messaging interval clock of the local insertion logic. The idle state represents a situation in which interval clock synchronization has been achieved in both directions, but no message is pending in the local transmit message buffer. The space state represents an intra-packet interval between message words. The message word state represents the transmission of the next message word.

The initial state is a state that can be reached via transitions 400-405. Each of these transitions can be triggered when the finite state machine is in the transition's associated originating state and the enable signal is de-asserted and/or the reset signal is asserted. Transitions 404-405 can additionally be triggered if the controller asserts a transmit error signal while the finite state machine is in the space or message word states, indicating that an error has been encountered before transmission of the full message was completed.

The no lock state can be reached via transitions 410-415. Transition 410 occurs when the controller's firmware settings assert the enable signal. Concurrent with the transition the controller selects the idle logic to pass a default "idle" pattern with a status field that indicates that the local extraction logic has not achieved a lock, i.e., has not yet been synchronized to the messaging interval clock of the remote end. For as long as the local extraction logic remains unsynchronized to the remote interval clock, transition 411 is repeated after every N outbound data stream words, preserving the no lock state and maintaining the inserted additional word the idle pattern with the "no lock" status field. Transitions 412-413 are triggered if the local extraction logic later determines that synchronization with the remote interval clock has been lost, and the additional word is set to the default idle pattern and status field as before. Transitions 414, 415 are similarly triggered, but in addition to setting the additional word to the idle pattern with "no lock" status, the controller also sets a message sent status to false and a transmit error status to true.

The local lock state can be reached via transitions 421-425. Transition 421 occurs when the local extraction logic synchronizes to the remote interval clock ("local lock"), and the controller updates the status field accompanying the default idle pattern to indicate that local lock has been achieved ("locked status field"). This setting for the additional word is used as well for transitions 421-425. Transition 422 is repeated after every N data stream words until the local extraction logic determines that the status fields from the remote transceiver indicate that it has synchronized to the local interval clock ("remote lock"). Transitions 423-425 occur if the status fields from the remote transceiver indicate that it has lost synchronization with the local interval clock. For transitions 424, 425, which would occur if remote lock were lost during message transmission, the controller sets the message sent status to false and the transmit error status to true.

The idle state can be reached via transitions 432, 433, 435. Transition 432 occurs when the local extraction logic confirms both local lock and remote lock have been achieved. The additional word is set to the idle pattern with a locked status field. The controller remains in the idle state using transition 433 for as long as a transmit message ready flag remains de-asserted. Transition 435 occurs after successful transmission of a previous message, i.e., when the controller determines that the message word counter matches the predetermined message length and selects the last contents of the transmit message buffer as the additional word to be inserted. The controller sets the message sent status to true and the transmit error status to false.

The space state can be reached via transitions 443-445. Transition 443 occurs when the transmit message ready flag is asserted while both the local lock and remote lock statuses are true. The controller sets the message sent status to false, the error status to false, the idle counter to zero, the message counter to zero, and sets the message data to a message preamble pattern. Assuming the local lock and remote lock statuses remain true, the controller remains in the space state using transition 444 for as long as the idle counter is less than the predetermined intra-message idle count. During each traversal of transition 444, the controller sets the additional word to be the idle pattern with the locked status field and increments the idle counter. Transition 445 occurs when the controller selects the next unsent content of the transmit message buffer as the additional word and increments the message word counter.

The message word state can be reached only via transition 454, which occurs when the idle counter reaches the predetermined intra-message idle count (assuming the local lock and remote lock statuses remain true). The controller selects the idle pattern with the locked status field as the additional word and resets the idle counter.

To summarize, the controller uses the finite state machine to ensure both local lock and remote lock are achieved before entering the idle state. Once there, the controller waits for message data to transmit, then begins the transmission process with a preamble. Between the preamble and first message word, and between each pair of message words, the controller provides one or more spaces filled with the idle pattern to facilitate maintenance of the locks during the message transmission. The number of spaces may range from 1 to 3 or more. If both locks are maintained, the controller returns to the idle state after the last word of the message is transmitted, setting the message sent bit. If synchronization is lost, the controller transitions to the no lock or local lock states until synchronization is restored, setting a transmit error bit. In at least some contemplated embodiments, the message buffer holds a packet of 32 words. The message words may be shorter than the channel words, e.g., the message words may be 32 bits while the channel words are 128 bits. In such situations, the idle pattern and lock status field may be used to pad the message words. Each packet of message words may include a payload and checksum and is preceded by the message preamble.

Figure 5:
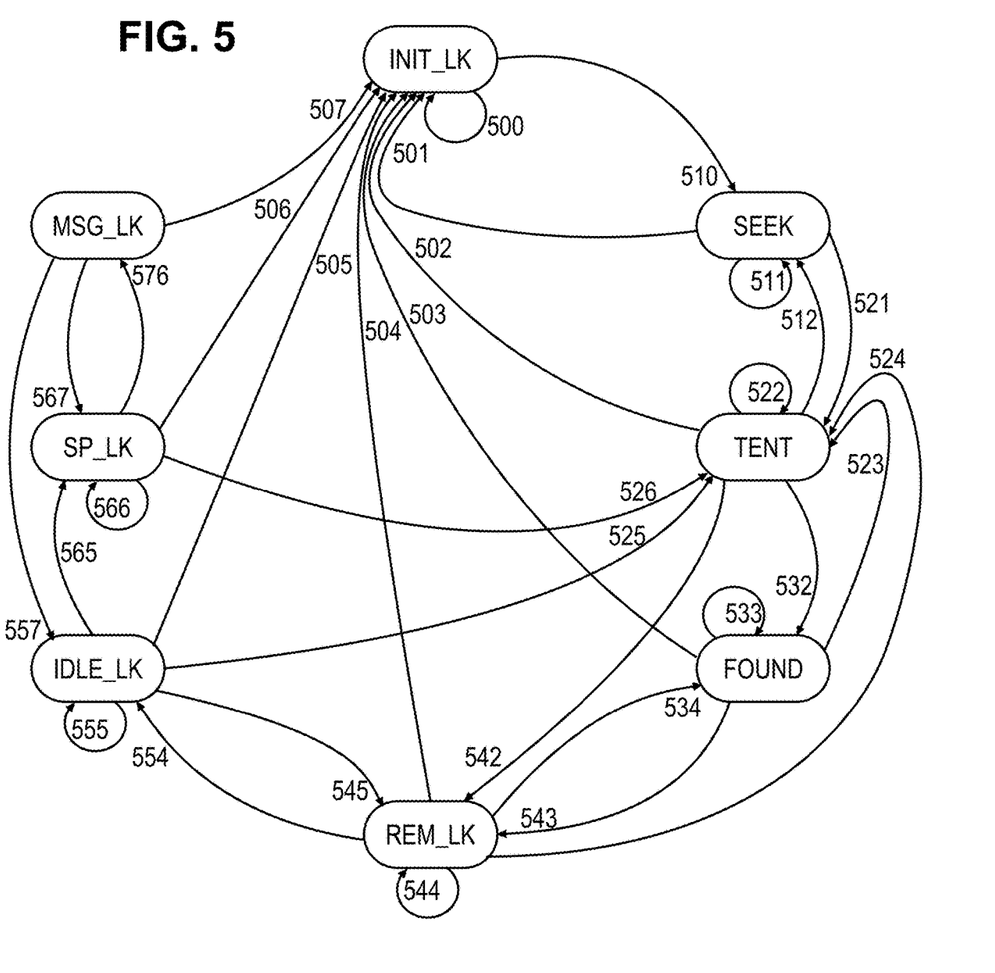
FIG. 5 is a flow diagram of an illustrative finite state machine for receive lock detection.

FIG. 5 shows an illustrative finite state machine for receive lock detection by the extraction logic, the machine having eight states: an initial lock (INIT_LK) state, a seek lock (SEEK) state, a tentative lock (TENT) state, a found lock (FOUND) state, a remote lock (REM_LK) state, an idle lock (IDLE_LK) state, a space lock (SP_LK) state, and a message lock (MSG_LK) state. All transitions except the ones to INIT and SEEK are at the Modulo-N count. The initial lock state represents a situation in which the extraction logic is disabled due to a reset or to de-assertion of the enable signal. The seek lock state represents a situation in which the firmware is set to enable the extraction logic by the assertion of the enable signal, but the controller has not yet found an instance of the idle pattern in the data stream. The tentative lock state represents a situation in which the logic has found an instance of the idle pattern and is verifying whether the idle pattern repeats at the expected interval. The found lock state represents a situation in which the logic has verified that a predetermined number of idle patterns repeat at the expected interval and is waiting for the remote transceiver to achieve lock. The remote lock state represents a situation in which at least one remote lock indication has been received and the logic is verifying that the remote lock indication is maintained for a predetermined number of repeats. The idle lock state represents a situation in which the logic has verified the desired number of local and remote lock indications and no new message preamble is yet detected. The space lock state represents a situation in which an intra-message space is expected whether due to detection of a new message preamble or a new message word. The message lock state represents a situation in which a message word is expected.

The initial lock state can be reached via transitions 500-507, each of which occur if the reset signal is asserted or the enable signal is de-asserted. For each of these transitions, the logic sets the idle lock signal (used by the finite state machine for message reception) to false.

During SEEK, the lock logic scans the data stream for a match to the default idle pattern. The logic tracks the position of the first bit in the sequence when scanning. If no idle pattern is detected within a message interval, the logic adjusts the position of the first bit when scanning the next message interval for the default idle pattern. Once the default idle pattern is detected, the Modulo-N counter is reset to mark the location of the extra words in the data stream and to pause the data stream buffer write clock or otherwise drop the extra words from the data stream.

The seek lock state can be reached via transitions 510-512. Transition 510 occurs when the enable signal is asserted. Transitions 511 and 521 occur when a word sample from the data stream fails to match the idle pattern, causing the logic to set the local idle lock and the remote idle lock bits to zero.

The tentative lock state can be reached via transitions 521-526, each of which cause the logic to set the local idle lock and remote idle lock bits to zero. Transition 521 occurs when a word sample from the data stream matches the idle pattern, and the logic sets the local lock counter to zero. Transition 522 occurs when a subsequent word sample from the data stream at the expected interval matches the idle pattern but the minimum idle count hasn't yet been reached, causing the logic to increment the local lock counter. Transitions 523 and 524 occur when a subsequent word sample at the interval count unexpectedly fails to match the idle pattern, and the logic resets the local lock counter when this happens. Transitions 525 and 526 occur when the local lock history count falls below a threshold, and again the local lock counter is reset if this happens.

The found lock state can be reached via transitions 532-534. In each case, the logic sets the local idle lock signal to true and the remote idle lock signal to false. Transition 532 occurs when an expected idle pattern is detected causing the local lock counter to reach a predetermined target, but the status field accompanying that idle pattern does not indicate achievement of a remote lock. The logic sets the local lock history count to one. Transitions 533 and 534 occur when an expected idle pattern is detected with a no lock status field, causing the logic to increment the local lock history count. The logic may tolerate single-bit errors in the idle pattern matching test when incrementing the local lock history count.

The remote lock state can be reached via transitions 542-545. In each case, the logic sets the local idle lock and remote idle lock signals to true. Transition 542 occurs when an expected idle pattern is detected causing the local lock counter to reach a predetermined target and the status field accompanying that idle pattern indicates achievement of a remote lock. The logic sets a remote lock counter to zero, the local lock history count to one, and the remote lock history count to zero. Transition 543 occurs when an expected idle pattern is detected with a locked status field, causing the logic to update the local lock history count and to set the remote lock history count to zero and the remote lock counter to zero. Transition 544 occurs when an expected idle pattern is detected with a locked status field and the remote lock counter has not yet reached a minimum target value. The logic increments the remote lock counter and updates the remote lock history count. As with the local lock history count, the controller may tolerate single bit errors in idle pattern when determining whether to increment the remote lock history count. Transition 545 occurs when a local lock history count remains above a local lock threshold value but the remote lock history count falls below a remote lock threshold value. The logic updates the local lock history count but resets the remote lock history count.

The idle lock state can be reached via transitions 554, 555, 557. With each of these transitions, the local idle lock signal is set to one and the remote idle lock is set to one. Transition 554 occurs when the logic detects an expected idle pattern with a locked status field and the remote lock counter reaches the minimum target value. The local lock history count is updated and the remote lock history count is set to one. Transition 555 occurs if the receive message buffer has not yet been read or the message slot does not yet hold a message preamble, assuming the local lock history count and remote lock history count remain above a local lock threshold value and a remote lock threshold value, respectively. The logic updates the local lock history counts and the remote lock history counts. Transition 557 occurs when the message counter hits the predetermined message length.

The space lock state can be reached via transitions 565-567. Transition 565 occurs when the message buffer has been read and a new message preamble is received. The intra-message idle counter is set to zero. Transition 566 occurs when the intra-message idle counter is less than the preset value and the local lock history count remains above the local lock threshold value. The logic increments the intra-message idle counter and updates the local lock history count. Transition 567 occurs when the message word counter has not yet reached the predetermined message length.

The message lock state can be reached only via transition 576, which occurs when the intra-message idle counter hits the preset value. The logic resets the intra-message counter value and updates the local lock history count.

To summarize, the controller uses the finite state machine to obtain and maintain indicators for both a local lock and remote lock by seeking and verifying the appearance of the idle pattern and status fields at expected intervals. During the seek state, the logic scans the data stream to find matches to the predetermined idle pattern and in the tentative state the logic verifies that the logic patterns repeat at the expected interval before setting the local lock indicator. In the found state, the logic checks the status fields of the extra words to verify that the locked status field appears at least a predetermined number of times before setting the remote lock indicator. In the idle state the logic maintains a history of detected idle patterns, reverting to an earlier state only if the history falls below a predetermined threshold. The threshold is less than the minimum target value, providing hysteresis for both the local and remote lock indicators. In the space lock and message word lock states the logic relies on the intra-message spaces to maintain the lock indicators during message reception. The status fields of the intra-message space words may be neglected to avoid inadvertent truncation of the message payload.

Figure 6:
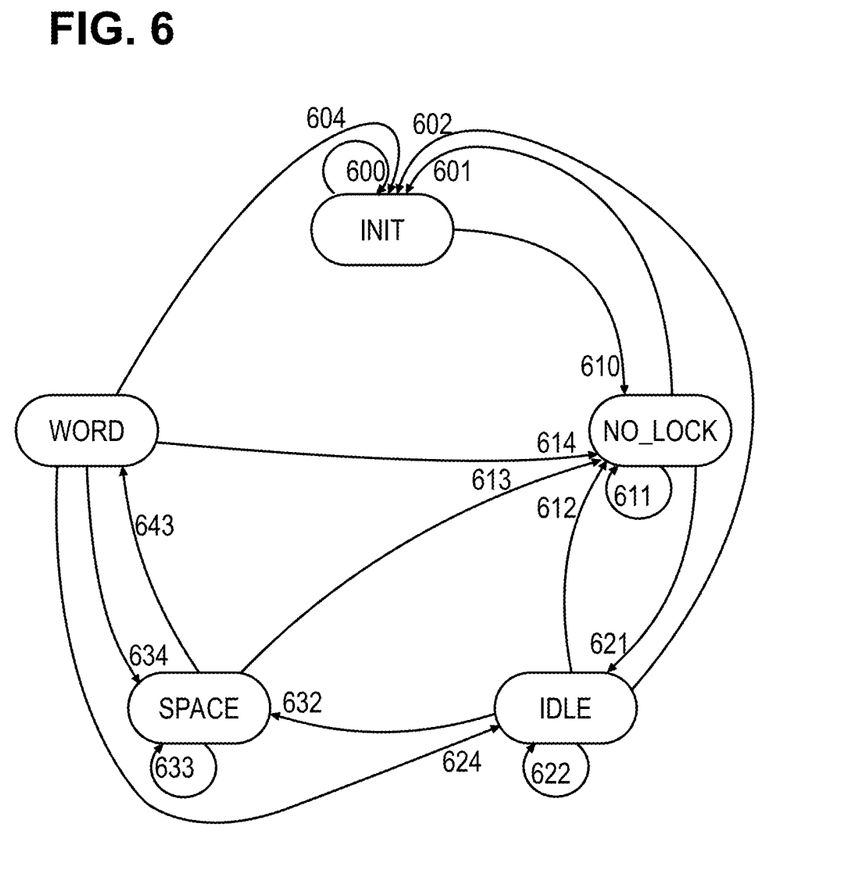
FIG. 6 is a flow diagram of an illustrative finite state machine for message reception.

FIG. 6 shows an illustrative finite state machine for message reception having five states: the initial (INIT) state, the no lock (NO_LOCK) state, the idle (IDLE) state, the space (SPACE) state, and the message word (WORD) state. The initial state represents the situation in which the extraction logic is disabled, whether due to a reset or de-assertion of an enable signal. The no lock state represents a situation in which the logic has been enabled but the lock detection logic has not asserted the idle lock signal. The idle state represents the situation in which the idle signal is asserted and the extraction logic is waiting for a message preamble or waiting for the receive message buffer to be read. The space state represents the situation where the logic expects an intra-message space, and the message word state represents the situation where the logic expects a message word.

The initial state is a state that can be reached via transitions 600-602, 604. Each of these transitions can be triggered when the finite state machine is in the respective originating state and the enable signal is de-asserted and/or the reset signal is asserted.

The no lock state can be reached via transitions 610-614. Each of these transitions can be triggered from the respective originating state if the detection logic de-asserts the idle lock signal.

The idle state can be reached via transitions 621, 622, 624. Transition 621 occurs when the idle lock signal is asserted. Transition 622 occurs for as long as an unread message resides in the receive message buffer or for as long as no new message preamble is received. Transition 624 occurs when the message word counter reaches the predetermined message length. The message ready signal is asserted, and the message word counter is incremented.

The space state can be reached via transitions 632-634. Assuming the idle lock signal remains asserted and no unread message is in the receive message buffer, transition 632 occurs when a new message preamble is received. The logic may accommodate single bit errors when detecting the preamble. The intra-message space counter and message word counter are reset to zero. Transition 633 occurs for as long the intra-message space counter remains less than the expected number of intra-message spaces and the intra-message space counter is incremented. Transition 634 occurs after each message word for as long as the message word counter is less than the predetermined message length. The controller stores the message word in the receive buffer and increments the message word counter.

The message word state can be reached only via transition 643, and this transition occurs when the intra-message space counter reaches the expected number of intra-message spaces. The intra-message space counter is set to zero.

To summarize, the controller uses this finite state machine to monitor extra words for a message preamble and to thereafter store the predetermined number of message words in the receive buffer as a message packet. The controller then sets the message ready signal to indicate that the message packet can be read from the receive buffer. The space state is used to drop the intra-message spaces from the data stream.

In some contemplated implementations, each message packet consists of $2^{10}$ bits, which may be sent as 32 words of 32 bits each. Each packet may optionally include a checksum field and the controllers may be configured to implement a packet numbering scheme and/or other suitable error detection and correction techniques to assure reliable operation. As one example, the formatting of the message blocks may be similar to that described in Clause 82.2 of the IEEE 802.3 Standard for 100G Base-R PCS, supporting the 66b Block Lock Synchronization technique described in Clause 82.2.12. The transceivers may further implement an acknowledgement or non-acknowledgement protocol to ensure that corrupted message packets are retransmitted.

The default idle pattern may preferably be chosen to avoid any special protocol patterns that might be used by a standard communications protocol so as to avoid unduly impairing operation of the standard communication protocol before synchronization is achieved or when synchronization is lost.

Numerous alternative forms, equivalents, and modifications will become apparent to those skilled in the art once the above disclosure is fully appreciated. For example, a 1:1 cable has been used in the foregoing description, but the principles disclosed hereinbelow are also applicable to optical modules, standalone transceivers, breakout cables, and other applications of SerDes devices. The transceivers may also provide bit multiplexing to convert between a first number of lanes on the host side and a second number of lanes on the line side. Though a fill-level-based determination of line-side clock frequencies is advantageous, it is not a requirement as the line side clock frequency can be determined in other ways with, e.g., bit stuffing being used to compensate for buffer underfills. It is intended that the claims be interpreted to embrace all such alternative forms, equivalents, and modifications that are encompassed in the scope of the appended claims.

What is claimed is:

1. An in-band communications method that comprises, in a local transceiver:
   buffering an outbound data stream from a host-side receiver with a data stream buffer, the outbound data stream having a first bit rate; and
   providing a line-side data stream having a second bit rate greater than the first bit rate, the line-side data stream representing the outbound data stream with an additional word after every N words of the outbound data stream,
   the additional words including message words.

2. The in-band communications method of claim 1, wherein the second bit rate is derived from a fill level of the data stream buffer.

3. The in-band communications method of claim 1, wherein the additional words further include a predetermined number of idle words that separate adjacent message words, the predetermined number being greater than zero.

4. The in-band communications method of claim 3, wherein the idle words include synchronization information.

5. The in-band communications method of claim 3, further comprising:
   storing a packet of message words in a transmit buffer, the packet including a first message word,
   wherein the additional words include a message preamble separated from the first message word by the predetermined number of idle words.

6. The in-band communications method of claim 3, wherein the predetermined number of idle words is greater than one.

7. The in-band communications method of claim 3, wherein N is $10^4$ or greater.

8. The in-band communications method of claim 3, further comprising, in the local transceiver:
   receiving a line-side data stream representing an inbound data stream with an extra word after every N words of the inbound data stream, the extra words including receive message words and idle words, with adjacent receive message words separated by the predetermined number of idle words;
   storing the receive message words in a receive buffer; and
   providing a host-side data stream representing the inbound data stream without the extra words to a host-side transmitter.

9. The in-band communications method of claim 8, wherein each of the idle words in the line-side data stream representing the inbound data stream includes a status field indicating whether a remote transceiver is synchronized to the additional words, and wherein each of the idle words in the line-side data stream representing the outbound data stream includes a status field indicating whether the local transceiver is synchronized to the extra words.

10. The in-band communications method of claim 9, further comprising: using a finite state machine to establish synchronization with the extra words by scanning the line-side data stream for idle words occurring after every N words of the inbound data stream.

11. An in-band communications transceiver comprising:
   a data stream buffer configured to buffer an outbound data stream from a host-side receiver, the outbound data stream having a first bit rate;
   insertion logic configured to create a line-side data stream representing the outbound data stream by inserting an additional word after every N words of the outbound data stream, the additional words forming a sequence including message words and idle words with adjacent message words separated by a predetermined number of idle words, the predetermined number being greater than zero; and a line-side transmitter configured to transmit the line-side data stream at a second bit rate that is derived from a fill level of the data stream buffer.

12. The in-band communications transceiver of claim 11, further comprising:

a transmit buffer configured to store a packet of message words, the packet including a first message word, wherein the sequence of additional words includes a message preamble separated from the first message word by the predetermined number of idle words.

13. The in-band communications transceiver of claim 11, wherein the predetermined number of idle words is greater than one.

14. The in-band communications transceiver of claim 11, wherein N is $10^4$ or greater.

15. The in-band communications transceiver of claim 11 further comprising:

a line-side receiver configured to receive a line-side data stream representing an inbound data stream with an extra word after every N words of the inbound data stream, the extra words including receive message words and idle words, with adjacent receive message words separated by the predetermined number of idle words;

extraction logic configured to store the receive message words in a receive buffer and to store the inbound data stream in the data stream buffer; and a host-side transmitter configured to transmit the inbound data stream without the extra words.

16. The in-band communications transceiver of claim 15, wherein each of the idle words in the line-side data stream representing the inbound data stream includes a status field indicating whether a remote transceiver is synchronized to the additional words, and wherein each of the idle words in the line-side data stream representing the outbound data stream includes a status field indicating whether the extraction logic is synchronized to the extra words.

17. The in-band communications transceiver of claim 16, wherein the extraction logic is configured to pause a write clock to the data stream buffer when storing a receive message word in the receive buffer.

18. The in-band communications transceiver of claim 16, wherein the extraction logic is configured to implement a finite state machine for achieving and maintaining synchronization with the extra words.

19. The in-band communications transceiver of claim 11, wherein the insertion logic is configured to pause a read clock to the data stream buffer when inserting an additional word.

20. The in-band communications transceiver of claim 11, wherein the insertion logic is configured to implement a finite state machine for transmitting packets of message words with the predetermined number of idle words between the adjacent message words.

* * * * *